(No Model.)
C. G. WARNER.
DETACHABLE SLEIGH RUNNER.
No. 480,302. Patented Aug. 9, 1892.
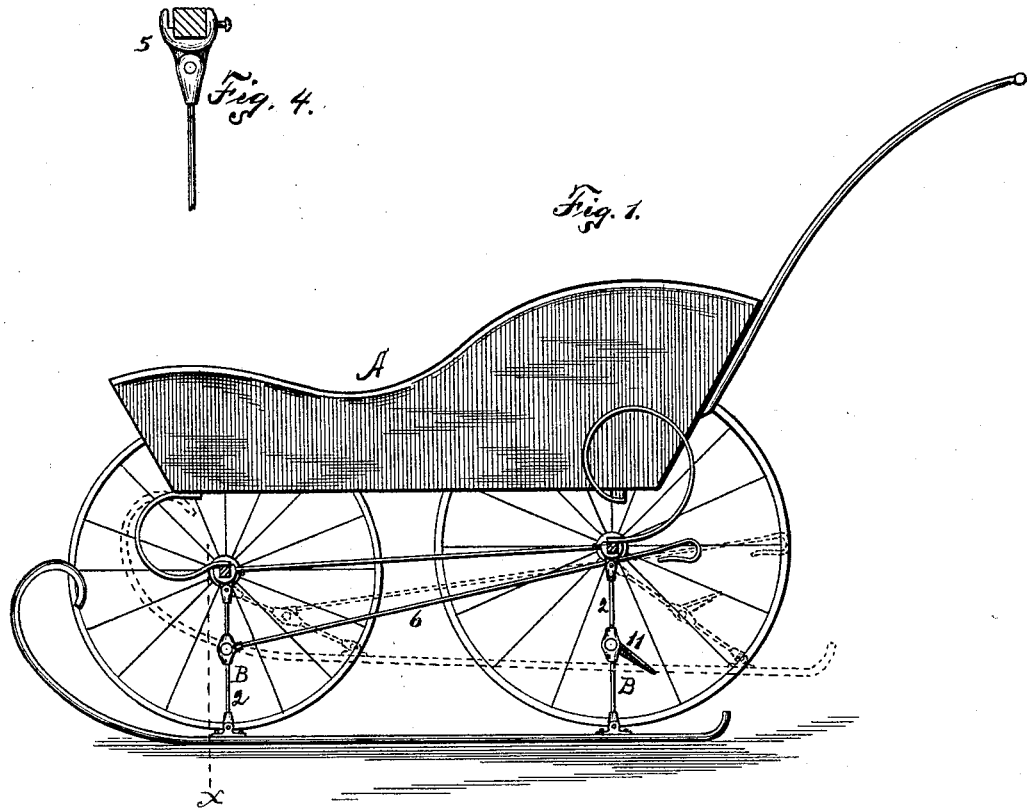
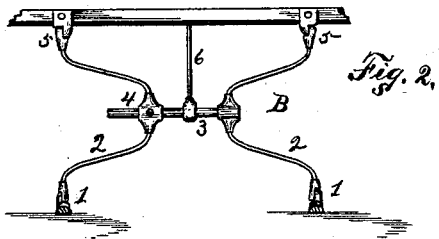
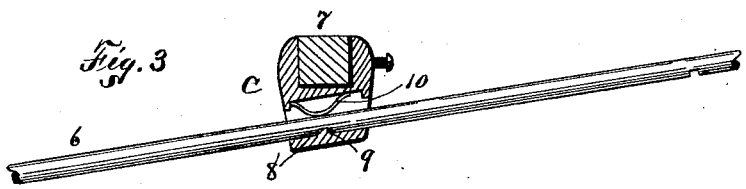
WITNESSES:
INVENTOR,
Charles G. Warner
BY
Smith & Denison
ATTORNEYS

UNITED STATES PATENT OFFICE.

CHARLES G. WARNER, OF SYRACUSE, NEW YORK.

DETACHABLE SLEIGH-RUNNER.

SPECIFICATION forming part of Letters Patent No. 480,302, dated August 9, 1892.

Application filed September 19, 1891. Serial No. 406,209. (No model.)

*To all whom it may concern:*

Be it known that I, CHARLES G. WARNER, of Syracuse, in the county of Onondaga, in the State of New York, have invented new and useful Improvements in Detachable Runners, of which the following, taken in connection with the accompanying drawings, is a full, clear, and exact description.

My invention relates to detachable sleigh-runners adapted to be placed under an ordinary child's carriage for the purpose of using the wagon as a sleigh in winter.

My object is to produce such a detachable sled easily and quickly attached to a carriage and which may be conveniently operated, so as to raise the wheels for the purpose of using the runners over ice and snow and the runners can be drawn up under the wheels out of the way when it is desired to run over bare ground.

My invention consists in the several novel features of construction and operation hereinafter described, and which are specifically set forth in the claims hereunto annexed.

It is constructed as follows, reference being had to the accompanying drawings, in which—

Figure 1 is a side elevation of a child's carriage provided with my sleigh attachment, showing the same drawn up in dotted lines. Fig. 2 is a view of the runners secured to the axle, detached, on line X X, Fig. 1. Fig. 3 is a section through the head, showing the operation of the rod by which the runners are drawn up to hold it in its raised position. Fig. 4 is a sectional view of the head stepped, located upon the upper end of the beams for the purpose of receiving axles of different sizes.

A is an ordinary carriage constructed in the usual way.

B is the adjustable and detachable sled, consisting of runners 1, beams 2, journaled thereto, and journaled to their upper ends are stepped clamping-heads 5, receiving the axle.

3 are cross-rods connecting the beams or knees of the sled and adapted to adjust the distance between the beams by means of a set-screw passing through eyes 4 in the said knees.

6 is a rod secured at one end to the forward knees or the rod connecting them, passing back to the rear of the carriage, as shown, and having a sliding head C secured thereon, the said head having a recess 7 in its upper face, by which it is adapted to be secured to the axle of a carriage. One of the faces, and preferably the lower face, of this rod 6 is provided with recesses 8 and adapted to fit into lugs 9, located within the opening of the head C and adapted to hold the rod 6 at any point by the spring 10 when the recesses and lugs are in engagement, as shown in Fig. 3.

11 is a foot-piece secured to the rear cross-bar for the purpose of holding the sled in position when it is desired to raise the carriage upon the sled, as shown in Fig. 1.

When it is desired to use the wheels instead of the runners, I take hold of the other end of the rod 6 and raise the runners to the position shown in dotted lines in Fig. 1, where it is held by the engagement of the recesses with the lug, as shown in Fig. 3.

What I claim, and desire to secure by Letters Patent, is—

1. The herein-described detachable sleigh, comprising runners, beams mounted substantially centrally upon the cross-rod between the axle and runners and adjustable laterally thereon and having their lower ends loosely secured to the runners and their upper ends provided with heads loosely secured thereto for the purpose of receiving the axle, and means for detachably securing said head to the axle, as set forth.

2. The herein-described sleigh, comprising runners, beams loosely secured thereto and secured together substantially centrally upon the cross-rod, heads loosely secured thereto at the upper ends of the beams, a rod having recesses in one side loosely secured to the forward beam, and a slidingly-mounted head adapted to be secured to the rear axle, as set forth.

3. The herein-described detachable sleigh, comprising runners, beams loosely secured together at their lower ends and provided at their upper ends with loosely-secured heads for the purpose of receiving the axle, the detachable head C, adapted to be secured to the rear axle and having an opening in its lower side, the inner face of which is provided with a strap-spring 10 and the inwardly-projecting lug, and a rod loosely secured to the forward beam, thence extending rearwardly through the opening in the head C and provided with recesses for the purpose of engaging with the lugs in the opening therein.

4. The herein-described detachable sleigh, comprising runners, beams mounted upon the rod centrally and adjustably and having their lower ends loosely secured to the runners and their upper ends provided with heads loosely secured thereto for the purpose of receiving the axle, and means for detachably securing said heads to the axle, as set forth.

In witness whereof I have hereunto set my hand this 11th day of September, 1891.

CHAS. G. WARNER.

In presence of—
  HOWARD P. DENISON,
  C. W. SMITH.